(12) United States Patent
Buehler et al.

(10) Patent No.: US 8,388,012 B2
(45) Date of Patent: Mar. 5, 2013

(54) TOWABLE IMPACT ATTENUATOR

(75) Inventors: Michael J. Buehler, Roseville, CA (US); Bret Eckert, Rocklin, CA (US); James B. Welch, Placerville, CA (US)

(73) Assignee: Energy Absorption Systems, Inc., Dallas, TX (US)

( * ) Notice: Subject to any disclaimer, the term of this patent is extended or adjusted under 35 U.S.C. 154(b) by 0 days.

(21) Appl. No.: 13/397,277

(22) Filed: Feb. 15, 2012

(65) Prior Publication Data

US 2012/0146313 A1 Jun. 14, 2012

Related U.S. Application Data

(60) Continuation of application No. 12/976,210, filed on Dec. 22, 2010, now Pat. No. 8,136,830, which is a division of application No. 11/272,352, filed on Nov. 10, 2005, now Pat. No. 7,874,572.

(60) Provisional application No. 60/642,699, filed on Jan. 10, 2005.

(51) Int. Cl.
*A01B 59/041* (2006.01)
*B60D 1/14* (2006.01)
*B62D 63/06* (2006.01)

(52) U.S. Cl. .................. 280/474; 280/456.1; 280/460.1; 293/136; 293/146

(58) Field of Classification Search .................. 280/451, 280/455.1, 456.1, 460.1, 461.1, 474, 482, 280/449; 293/107, 109, 110, 118, 119, 134, 293/135, 136, 137, 146, 148
See application file for complete search history.

(56) References Cited

U.S. PATENT DOCUMENTS

| | | |
|---|---|---|
| 3,722,920 A | 3/1973 | Reese |
| 3,822,076 A | 7/1974 | Mercier et al. |
| 3,861,717 A | 1/1975 | Knox |
| 3,971,583 A | 7/1976 | Kornhauser |
| 4,003,586 A | 1/1977 | Luck |
| 4,099,759 A | 7/1978 | Kornhauser |
| 4,313,616 A | 2/1982 | Howard |
| 4,352,484 A | 10/1982 | Gertz et al. |
| 4,537,374 A | 8/1985 | Barnoin et al. |
| 4,552,341 A | 11/1985 | Zucker et al. |

(Continued)

FOREIGN PATENT DOCUMENTS

| | | |
|---|---|---|
| EP | 0 507 496 A1 | 10/1992 |
| EP | 0 586 071 A1 | 3/1994 |

(Continued)

OTHER PUBLICATIONS

"Texas Crash Cushion Trailer to Protect Highway Maintenance Vehicles," Marquis, E.L., and Hirsch, T.J., Research Report 146-6, Research Study No. 2-8-68-146, Texas Transportation Institute, Texas A&M University, College Station, Texas, Aug. 1972, 45 pages.*

(Continued)

*Primary Examiner* — James Kramer
*Assistant Examiner* — Marc A Scharich
(74) *Attorney, Agent, or Firm* — Brinks Hoffer Gilson & Lione

(57) ABSTRACT

A crash attenuator includes a crash cushion having a front end, a rear end, and a trailer hitch component disposed adjacent the front end. The trailer hitch component is capable of being secured to a mating hitch component located on the towing vehicle, such that hitch components are capable of being rotated relative to each other about a substantially vertical axis. The crash attenuator further includes at least one wheel supporting the crash cushion. The wheel is rotatable about a substantially horizontal axis and is spaced rearwardly from hitch component. One or more tethers are positioned on opposite sides of the hitch component and are moveable relative to one or more guides connected to the crash cushion.

18 Claims, 8 Drawing Sheets

U.S. PATENT DOCUMENTS

| | | | |
|---|---|---|---|
| 4,600,178 | A | 7/1986 | Zucker et al. |
| 4,635,981 | A | 1/1987 | Friton |
| 4,645,226 | A | 2/1987 | Gustavsson et al. |
| 4,658,941 | A | 4/1987 | Gottwald et al. |
| 4,674,911 | A | 6/1987 | Gertz |
| 4,711,481 | A | 12/1987 | Krage et al. |
| 4,770,420 | A | 9/1988 | Gottwald et al. |
| 4,823,923 | A | 4/1989 | Moyer |
| 5,052,732 | A | 10/1991 | Oplet et al. |
| 5,101,927 | A | 4/1992 | Murtuza |
| 5,199,755 | A | 4/1993 | Gertz |
| 5,248,129 | A | 9/1993 | Gertz |
| 5,403,112 | A | 4/1995 | Carney, III |
| 5,403,113 | A | 4/1995 | Gertz et al. |
| 5,642,792 | A | 7/1997 | June |
| 5,697,657 | A | 12/1997 | Unrath, Sr. |
| 5,823,584 | A | 10/1998 | Carney, III |
| 5,947,452 | A | 9/1999 | Albritton |
| 5,967,573 | A | 10/1999 | Wang |
| 6,042,135 | A | 3/2000 | Ross |
| 6,092,959 | A | 7/2000 | Leonhardt et al. |
| 6,098,767 | A | 8/2000 | Unrath |
| 6,146,835 | A | 11/2000 | Kieffer et al. |
| 6,186,565 | B1 | 2/2001 | Unrath |
| 6,264,258 | B1 | 7/2001 | Li et al. |
| 6,279,973 | B1 | 8/2001 | Albertini et al. |
| 6,364,400 | B1 | 4/2002 | Unrath |
| 6,422,584 | B1 | 7/2002 | Bittroff et al. |
| 6,481,920 | B1 | 11/2002 | Leonhardt |
| 6,523,872 | B2 | 2/2003 | Breed |
| 6,579,034 | B1 | 6/2003 | Welch et al. |
| 6,581,992 | B1 | 6/2003 | Gertz |
| 6,619,491 | B2 | 9/2003 | Payne et al. |
| 6,626,449 | B2 | 9/2003 | Hazen |
| 6,659,491 | B2 | 12/2003 | Green |
| 6,668,989 | B2 | 12/2003 | Reid et al. |
| 6,866,284 | B2 | 3/2005 | Carlsson |
| 6,905,282 | B2 | 6/2005 | Leonhardt et al. |
| 6,926,324 | B1 | 8/2005 | Gertz |
| 6,942,263 | B2 | 9/2005 | Welch et al. |
| 7,125,198 | B2 | 10/2006 | Schiefferly et al. |
| 7,143,877 | B2 | 12/2006 | Dusserre-Telmon et al. |
| 7,300,223 | B1 | 11/2007 | Kennedy et al. |
| 7,341,397 | B2 | 3/2008 | Murphy |
| 7,354,056 | B2 | 4/2008 | Namuduri et al. |
| 7,735,614 | B2 | 6/2010 | Carlsson |
| 2002/0180179 | A1 | 12/2002 | Krauss |
| 2004/0021294 | A1 | 2/2004 | Carlsson |
| 2004/0120760 | A1 | 6/2004 | Carlsson |
| 2006/0151971 | A1 | 7/2006 | Buehler et al. |
| 2006/0151986 | A1 | 7/2006 | Reid et al. |
| 2006/0170228 | A1 | 8/2006 | Carlsson |
| 2007/0187201 | A1 | 8/2007 | Carlsson |
| 2008/0175661 | A1 | 7/2008 | Dyke et al. |
| 2008/0179901 | A1 | 7/2008 | Maus |
| 2008/0258362 | A1 | 10/2008 | Unrath |
| 2008/0286042 | A1 | 11/2008 | Dyke et al. |
| 2009/0174200 | A1 | 7/2009 | LaTurner et al. |
| 2010/0019517 | A1 | 1/2010 | Maus |

FOREIGN PATENT DOCUMENTS

| | | |
|---|---|---|
| FR | 2 729 979 A1 | 8/1996 |
| WO | WO 94/05527 A1 | 3/1994 |
| WO | WO 01/87671 A1 | 11/2001 |
| WO | WO 2005/085008 A1 | 9/2005 |

OTHER PUBLICATIONS

Letter dated Apr. 15, 2005 from John R. Baxter, P.E., Director, Office of Safety Design, U.S. Department of Transportation, Federal Highway Administration, to Dean L. Sicking, P.E., Ph.D., CEO, Safety by Design Company dated, Apr. 15, 2005, 6 pages.

Dexter Axle, Torflex® Application Information, pp. 11-13, dated prior to Jan. 10, 2005.

"Development of Trailer Attenuating Cushion for Variable Message Signs and Arrow Boards," Sicking, Dean L., Rohde, John R., and Reid, John D., Transportation Research Record, No. 1851, Highway and Facility Design 2003, pp. 65-73.

"Implementation Package Report No. 74-1—Texas Crash Cushion Trailer," Brown, Leonard E., PB 231 818, Implementation Division, Office of Development, Federal Highway Administration, U.S. Department of Transportation, Washington, D.C., Feb. 1974, 21 pages.

"Crash Cushion Trailer Protects Workers, Doubles Production Thru Added Security," Highway Research News, Issue 54, pp. 52-54, 1974.

Letter dated Jun. 27, 2006 from John R. Baxter, P.E., Director, Office of Safety Design, Office of Safety, U.S. Department of Transportation, Federal Highway Administration, to Michael Kempen, Impact Absorption, Inc., 5 pages.

Written Opinion of the International Searching Authority in International Application No. PCT/US05/47157, dated Aug. 8, 2007, 5 pages.

International Search Report for International Application No. PCT/US2005/047157, dated Aug. 8, 2007, 2 pages.

International Search Report and Written Opinion of the International Searching Authority for International Application No. PCT/US2008/052538, dated Jun. 12, 2008, 9 pages.

Office Action from U.S. Appl. No. 12/023,013, dated Dec. 7, 2009, 10 pages.

Amendment from U.S. Appl. No. 12/023,013, dated Apr. 7, 2010, 8 pages.

Notice of Allowance from U.S. Appl. No. 12/023,013, dated Jun. 3, 2010, 12 pages.

* cited by examiner

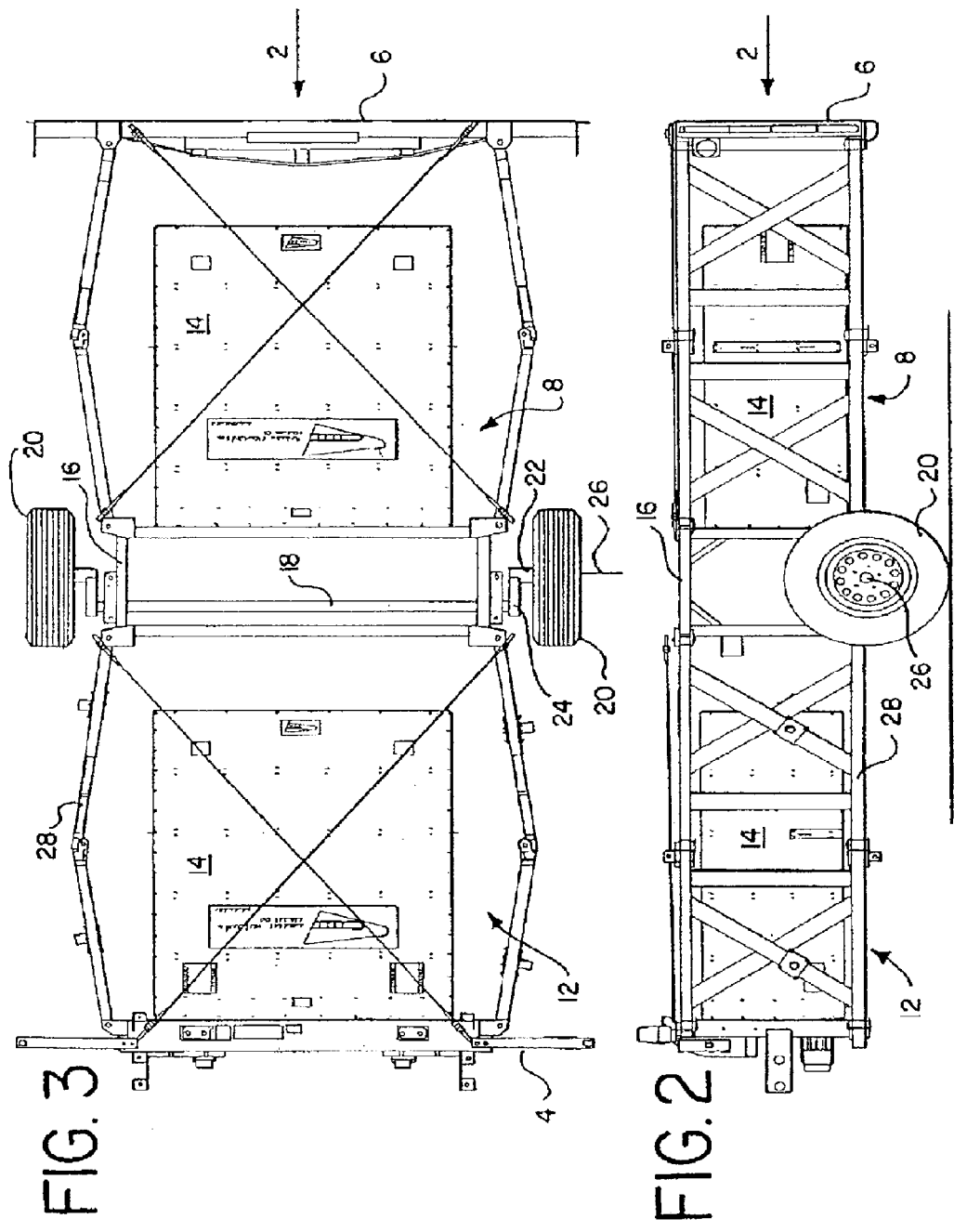

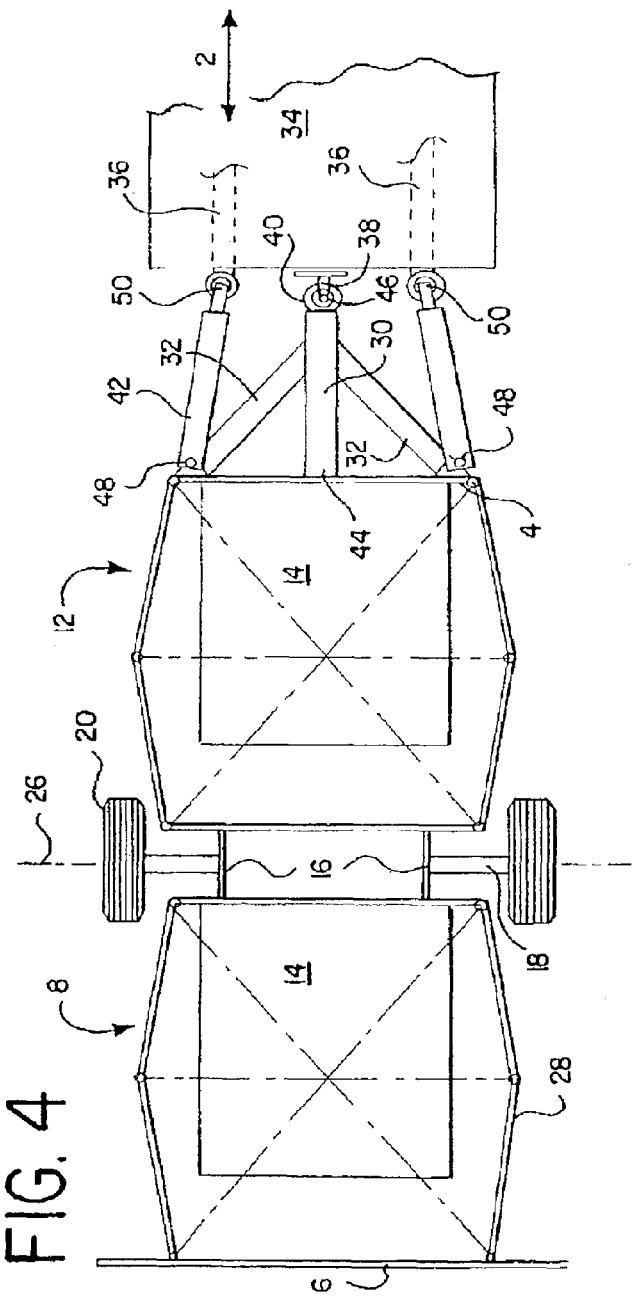
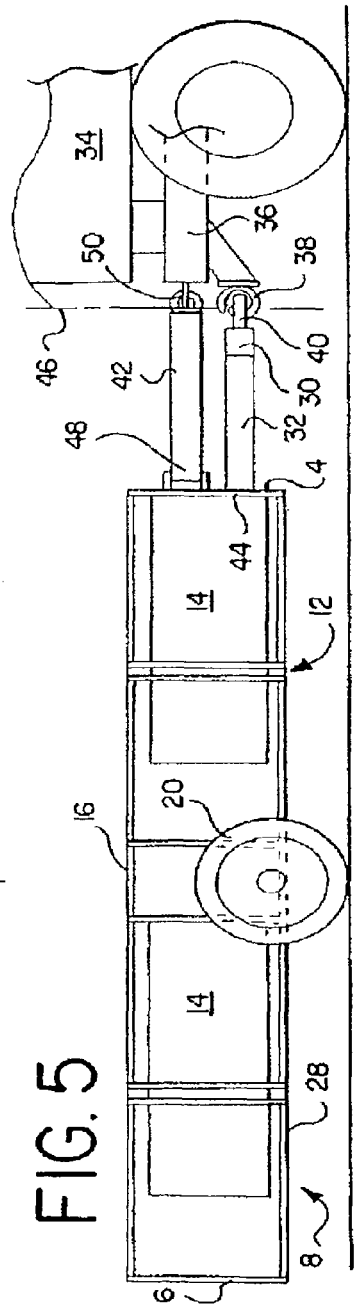

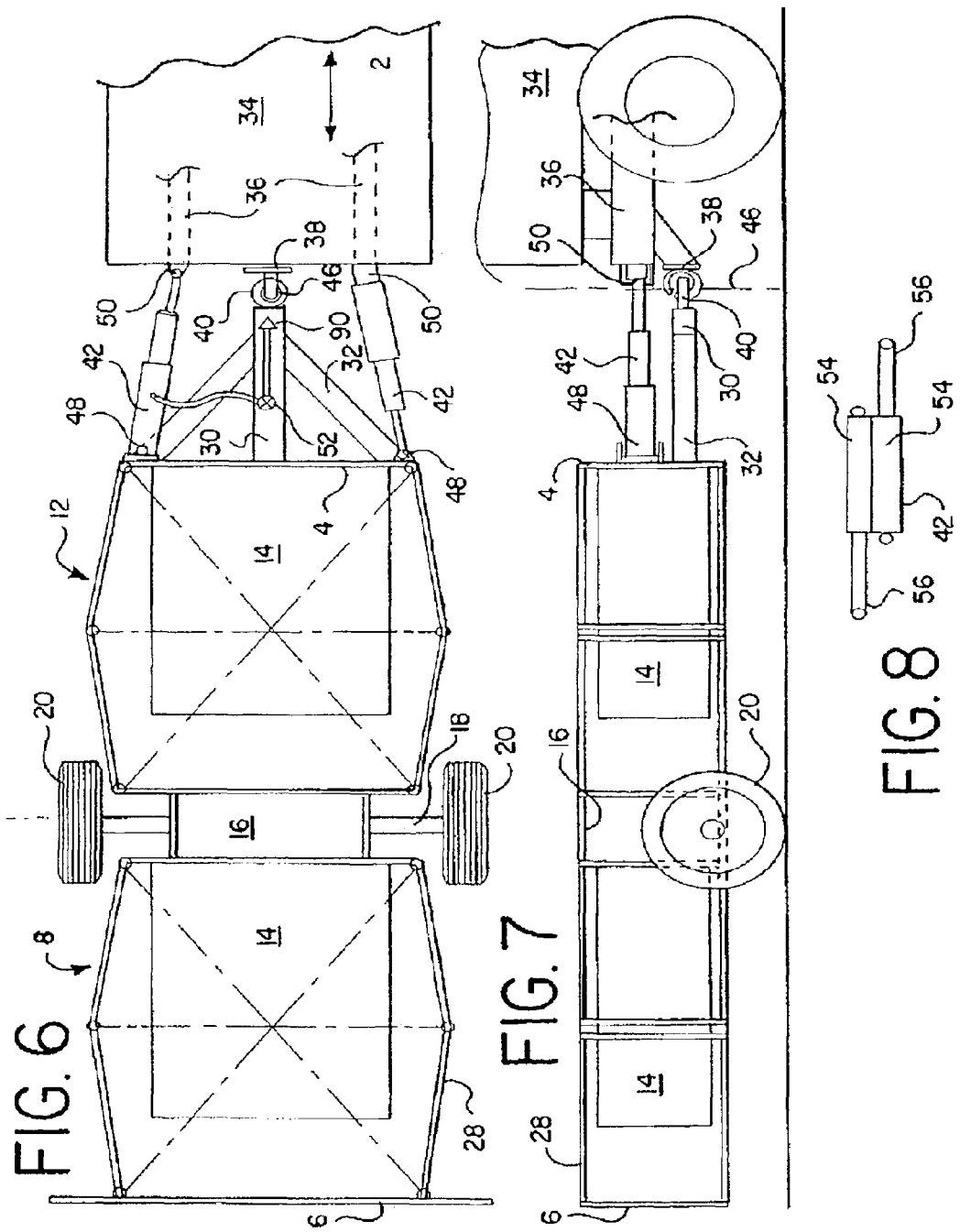

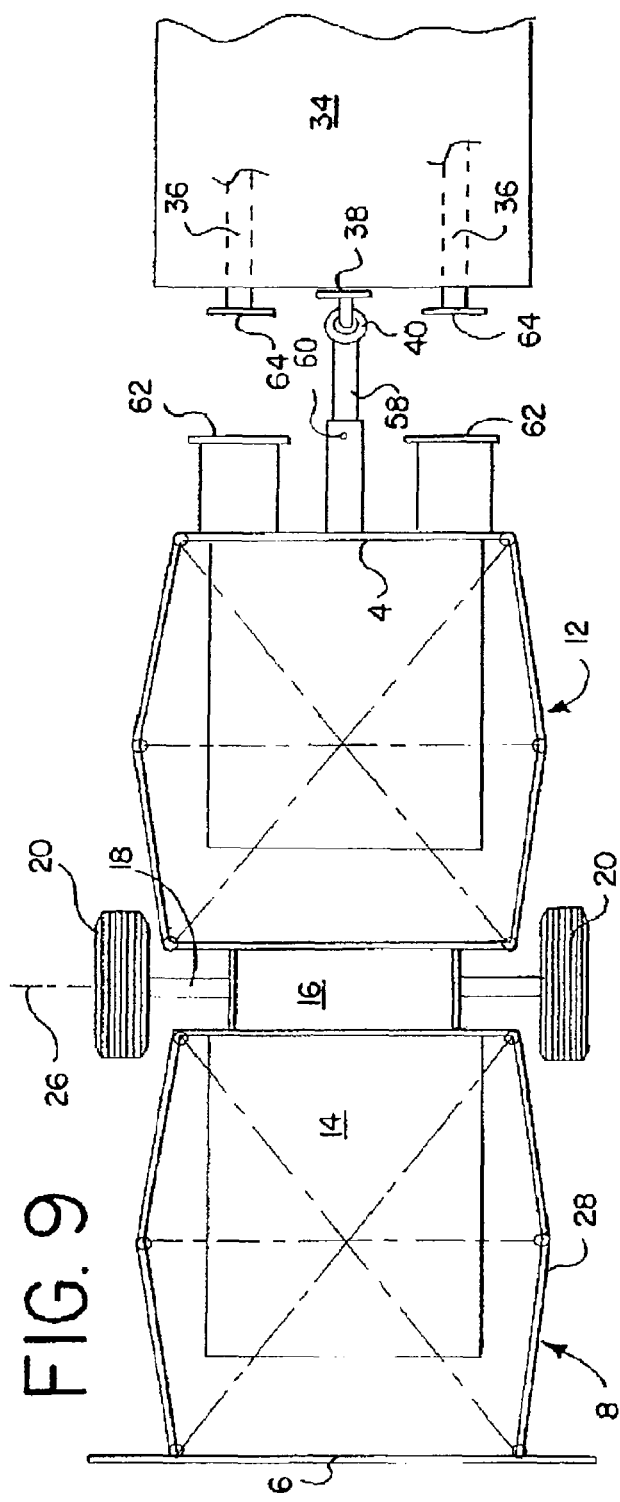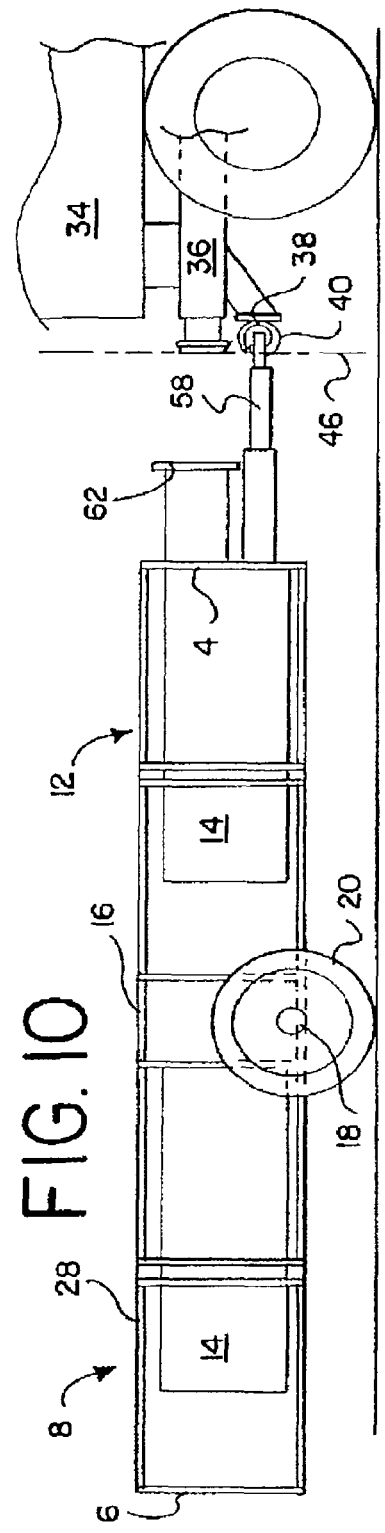

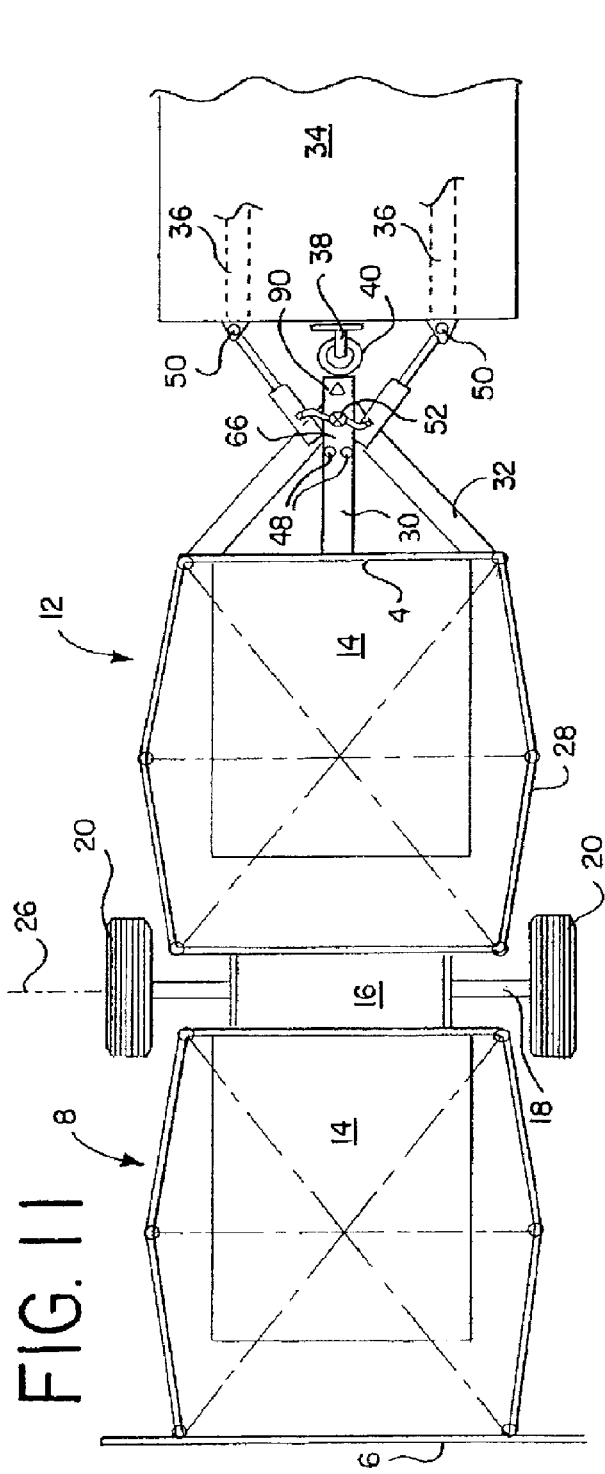
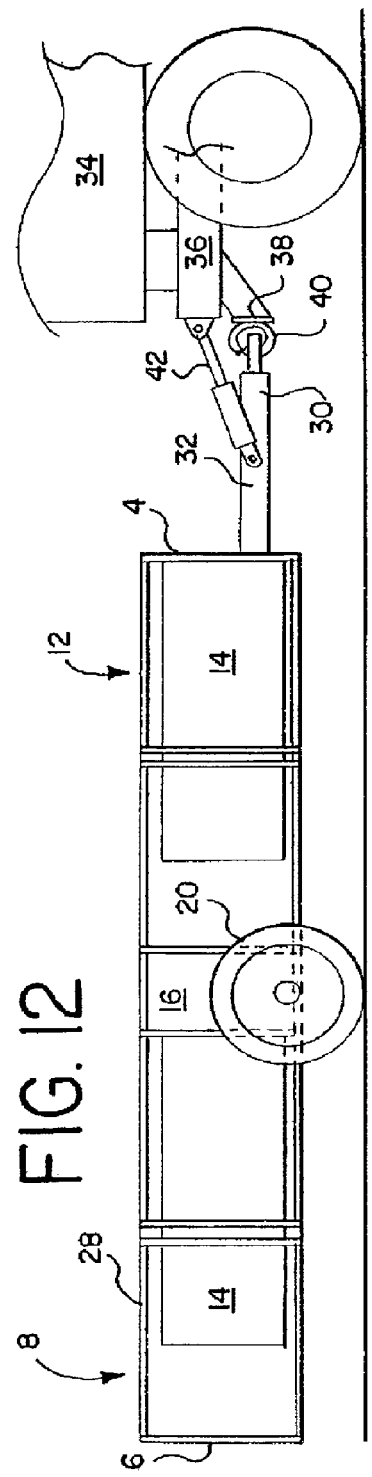

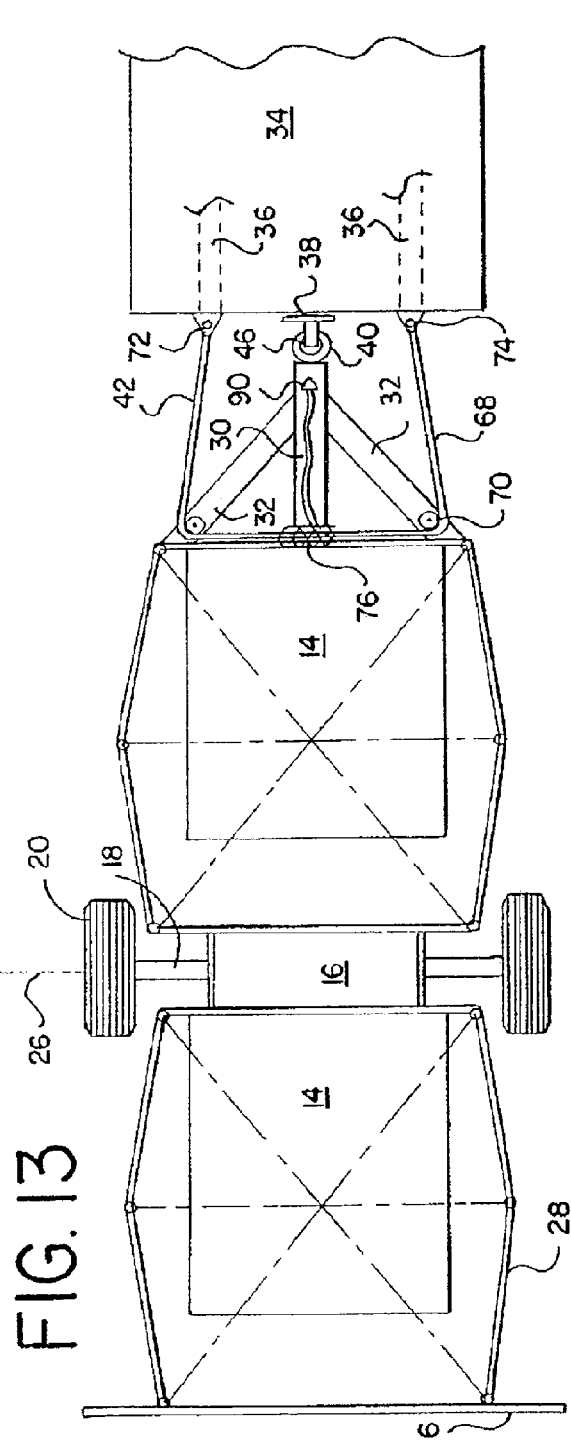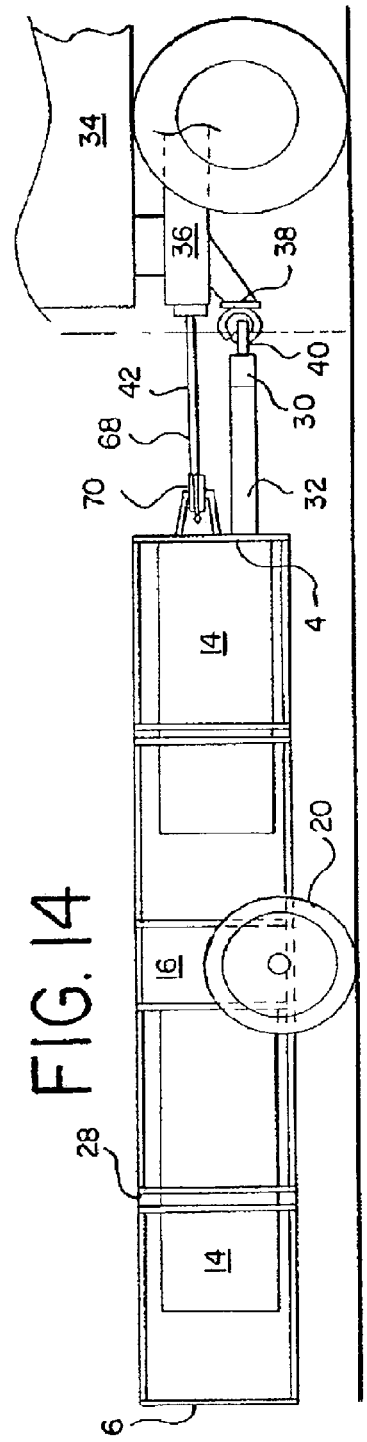

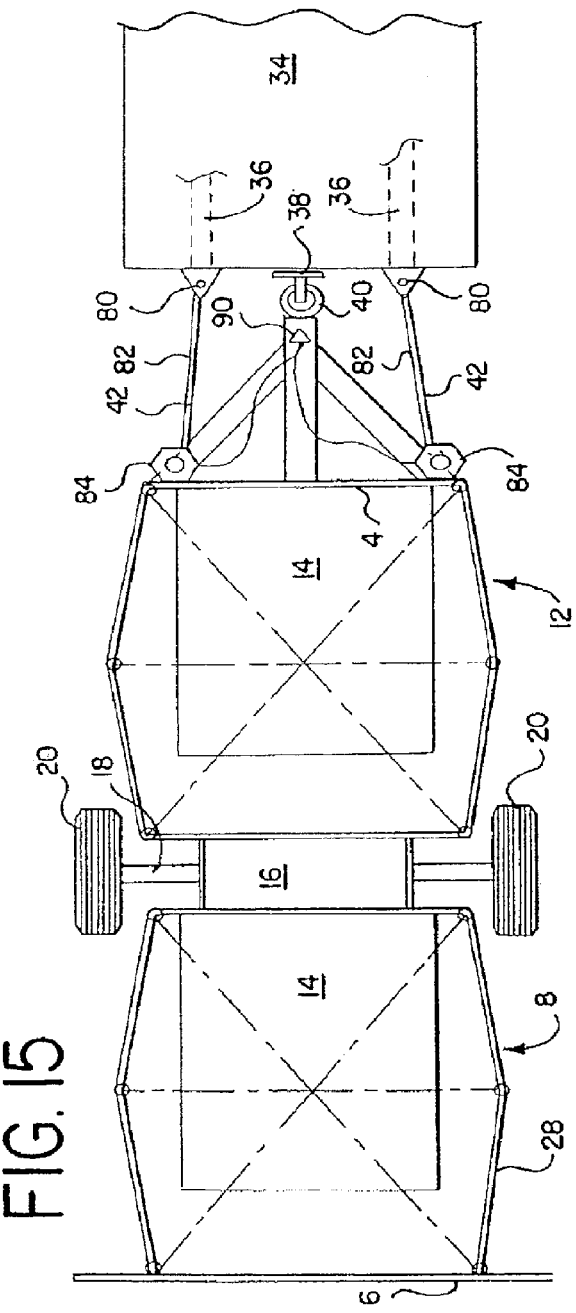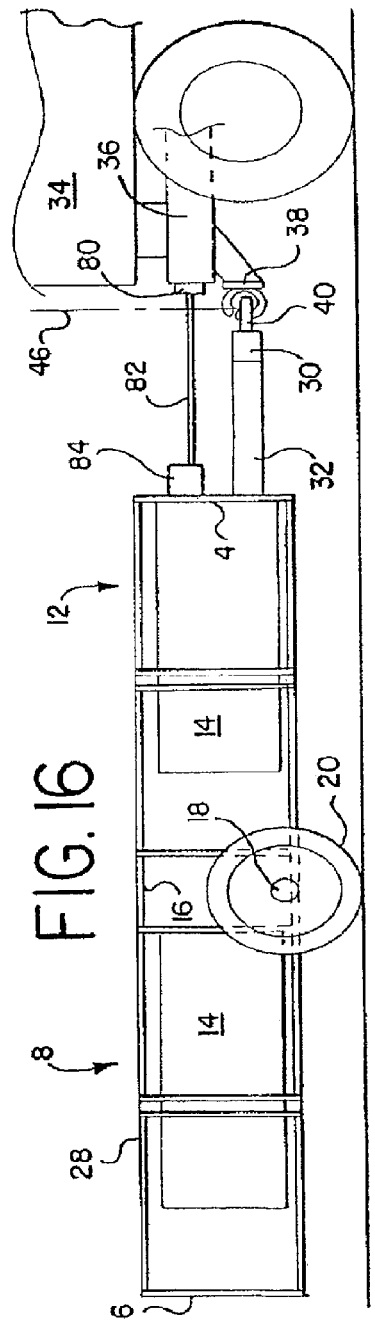

TOWABLE IMPACT ATTENUATOR

This application is a continuation of prior U.S. patent application Ser. No. 12/976,210, filed Dec. 22, 2010, now U.S. Pat. No. 8,136,830 which was a divisional of prior U.S. patent application Ser. No. 11/272, 352, filed Nov. 10, 2005, now U.S. Pat. No. 7,874,572 which claims the benefit of U.S. Provisional Application No. 60/642,699, filed Jan. 10, 2005, the entire disclosure of which is hereby incorporated herein by reference.

FIELD OF THE INVENTION

This invention relates to a vehicle system capable of attenuating energy during a crash, and in particular to a crash cushion capable of being towed behind a vehicle.

BACKGROUND

Crash cushions and attenuators are commonly secured to vehicles, such as trucks, operating on the roadways to protect other vehicles and their occupants during an impact. Often, such attenuators are secured to the rear of the truck, or other vehicle, and are cantilevered rearwardly therefrom. As such, the mounting structure of the attenuator must be able to support the shear and moment loads created by the cantilevered crash cushion, thereby leading to increased costs associated with the manufacture thereof. Moreover, attachment of the attenuator may be cumbersome.

SUMMARY

In one aspect, a crash attenuator includes a crash cushion having a front end, a rear end and a trailer hitch component disposed adjacent the front end. The trailer hitch component is secured to a mating hitch component located on the towing vehicle, such that hitch components are capable of being rotated relative to each other about a substantially vertical axis, for example during turns or backing operations. The crash attenuator further includes at least one wheel supporting the crash cushion. The wheel is rotatable about a substantially horizontal axis and is spaced rearwardly from the substantially vertical axis. The crash attenuator further includes at least one restraint element operable between at least a disengaged condition, wherein the crash cushion is capable of rotating about the substantially vertical axis, and an engaged condition, wherein the at least one restraint element constrains rotation of the crash cushion about the substantially vertical axis.

The foregoing paragraphs have been provided by way of general introduction, and are not intended to limit the scope of the following claims. The presently preferred embodiments, together with further advantages, will be best understood by reference to the following detailed description taken in conjunction with the accompanying drawings.

BRIEF DESCRIPTION OF THE DRAWINGS

FIG. 2 is a top view of the attenuator shown in FIG. 1.
FIG. 3 is a side view of the attenuator shown in FIG. 1.
FIG. 4 is a top view of a towable crash attenuator having a first embodiment of a hitching system.
FIG. 5 is a side view of the attenuator shown in FIG. 4.
FIG. 6 is a top view of a towable crash attenuator having a second embodiment of a hitching system.
FIG. 7 is a side view of the attenuator shown in FIG. 6.
FIG. 8 is an alternative embodiment of an extensible/compressible restraint element.
FIG. 9 is a top view of a towable crash attenuator having a third embodiment of a hitching system.
FIG. 10 is a side view of the attenuator shown in FIG. 9.
FIG. 11 is a top view of a towable crash attenuator having a fourth embodiment of a hitching system.
FIG. 12 is a side view of the attenuator shown in FIG. 11.
FIG. 13 is a top view of a towable crash attenuator having a fifth embodiment of a hitching system.
FIG. 14 is a side view of the attenuator shown in FIG. 13.
FIG. 15 is a top view of a towable crash attenuator having a sixth embodiment of a hitching system.
FIG. 16 is a side view of the attenuator shown in FIG. 15.

DETAILED DESCRIPTION OF THE PRESENTLY PREFERRED EMBODIMENTS

Figure 1:
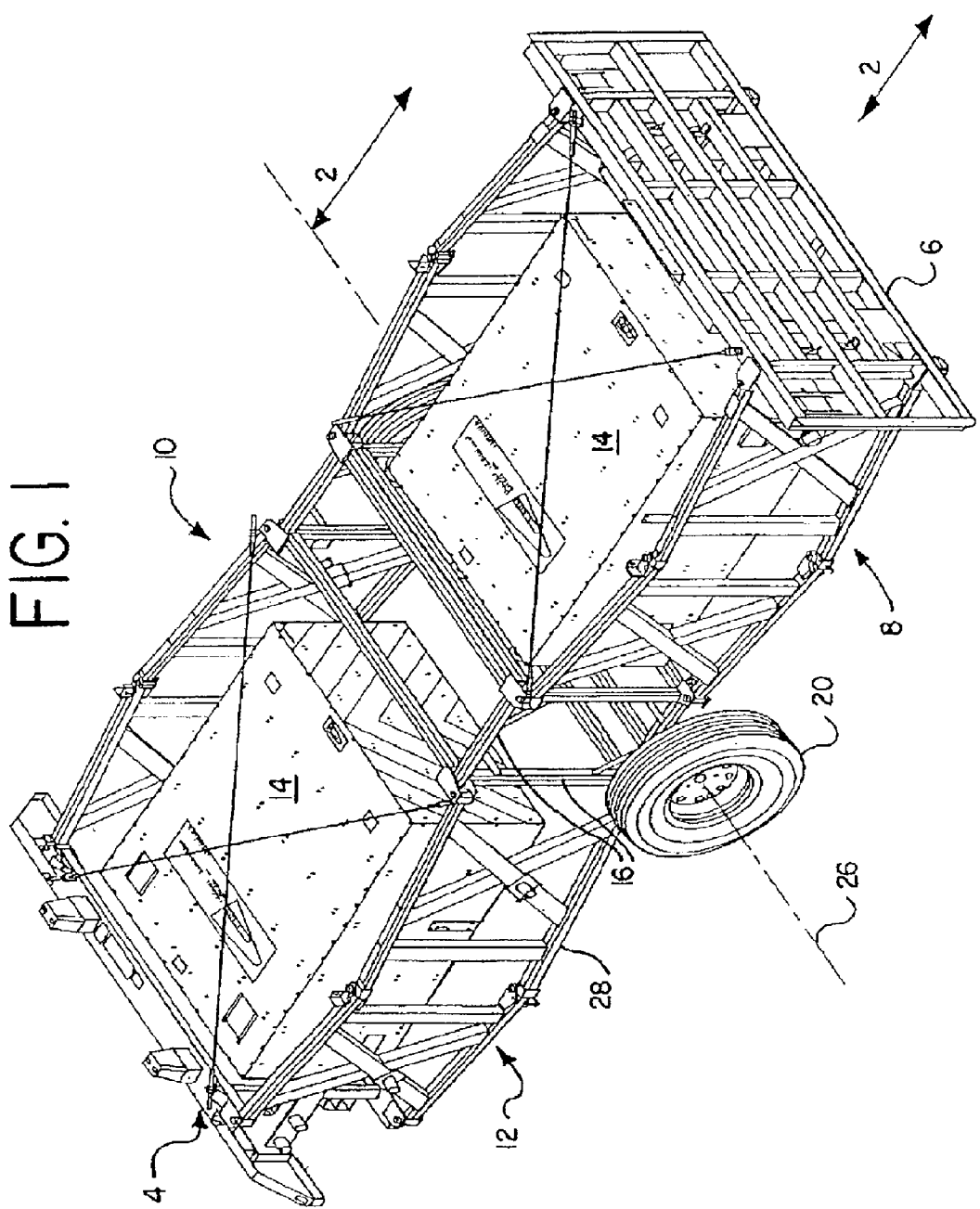
FIG. 1 is a perspective view of a first embodiment of a towable crash attenuator without a hitching system shown.

The term "longitudinal" refers to the lengthwise direction 2 between the front and rear of a crash cushion 10, and is aligned with and defines an axial impact direction generally parallel to the arrow indicating traffic flow in FIG. 1-3. The term "front," "forward," "forwardly" and variations thereof refer to the position or orientation relative to the end 4 of the crash cushion located adjacent or proximal to the towing vehicle and distal from the end that is initially impacted during an axial impact, while the term "rear," "rearward," "rearwardly" and variations thereof refer to the position or orientation relative to the tail or end 6 of the crash cushion located distal from the towing vehicle and which is initially impacted.

Turning now to the drawings, FIGS. 1-3 show perspective views of a crash cushion 10 incorporating preferred embodiments of this invention. In one embodiment, the crash cushion includes a frame 28 defining first and second bays 8,12, with energy dissipating cartridges 14 disposed in the first and second bays. Suitable crash cushions are disclosed for example and without limitation in U.S. Pat. Nos. 6,092,959 and 6,579,034 and U.S. patent application Ser. No. 10/628, 319, all of which are hereby incorporated herein by reference in their entirety. Suitable crash cushions also include the Safe-Stop™ 180 truck mounted attenuator, the Safe-Stop TMA® crash attenuator, the Alpha 70k™ truck mounted attenuator, the LS-Pro™ truck mounted attenuator, the Alpha 60MD® truck mounted attenuator and the Alpha 2001 MD TMA® crash attenuator all available from Energy Absorption Systems, Inc., located in Rocklin, Calif., the assignee of the present application. Of course, it should be understood that other embodiments of crash cushions, including single bay or cartridge embodiments, with or without frames, would also work.

In one embodiment, as shown in FIGS. 1-3, an axle assembly is secured to a frame structure 16 disposed between and connecting the first and second bays 8,12. In one embodiment, the intermediate frame structure 16 is substantially rigid, and does not collapse or become crushed during a vehicle impact. In one embodiment, the axle assembly is a torsion/suspension axle assembly, such as a Torflex® axle, which includes a main axle 18 and a pair of wheel axles 22 secured thereto with a pair of arms 24 that rotate against a biasing force of a torsion spring (not shown). Of course, it should be understood that other axle configurations, such as rigid/straight axle, or other suspension axles, including for example and without limitation leaf or compression springs with dampening systems, would also work. Two wheels 20 are secured to the axles 22 on opposite ends of the axle 18.

The wheels rotate about a horizontal axis of rotation 26. The wheels 20 are preferably spaced from the front end 4 of the crash cushion and are positioned to carry the load or weight of the crash cushion. The wheels, which are engaged with the ground, help guide the crash cushion in the longitudinal direction 2 during an impact.

Referring to FIGS. 4-7 and 9-14, the crash cushion includes a first hitching component, shown as a tongue 30 having one end 44 secured to the crash cushion, e.g., the frame, and an opposite free end 40. The first end can be rotatably secured to the crash cushion, or non-rotatably fixed thereto. In one embodiment, a pair of brace members 32 extend from the crash cushion and are secured to the tongue distal from the first end 44.

A vehicle 34, such as a truck, preferably has a pair of frame rails 36 extending in the longitudinal direction 2. The frame rails are spaced on opposite sides of a hitching component 38. The hitching component can include for example and without limitation, a hook, ball, fifth wheel or other known and suitable devices. The free end 40 of the tongue is configured to mate with the truck hitching component 38 and can include for example and without limitation, a loop, a socket or a mating structure for the fifth wheel. The two hitching components 38, 40 are configured to allow relative rotation about a vertical axis 46, such that the crash cushion can rotate relative to the tow vehicle during towing or backing operations. The hitching components 38, 40 also permit relative rotation about a horizontal axis, such that the crash cushion can rotate relative to the towing vehicle about the horizontal axis, for example when being towed over a bump or through a dip in the roadway.

Referring to FIGS. 4-16, one or more restraint elements 42 are connected or engaged between the crash cushion 10 and the towing vehicle 34. In particular, first and second restraint elements are positioned on opposite sides of the hitching component, shown as the tongue 30. In various embodiments, a single restraint element may be used, or more than two restraint elements may be used.

Referring to FIGS. 4 and 5, the restraint elements 42 are shown as rigid struts. The struts can be moved to a disengaged condition, wherein one or both ends of the strut are disengaged from the vehicle 34 and/or crash cushion 10. For example, in one embodiment, the struts have one end 48 pivotably secured to the crash cushion about a vertical axis. The struts, and in particular the ends 48, are pivoted sidewardly to a disengaged condition/position wherein the struts do not restrain the rotation of the crash cushion relative to the towing vehicle about the vertical axis 46. In another embodiment, the struts are pivoted upwardly or downwardly about a horizontal axis. When in this travel, non-impact position, wherein the restraints are in the disengaged condition/position, the truck and trailer can negotiate tight turns and backing situations.

When the vehicle is in a position where crash protection is desired, for example when parked along the side of a highway, the struts 42 are pivoted into an engaged condition or position, preferably with the free ends 50 thereof being secured to the vehicle adjacent respective frame rails 36, for example with a pin, latch or other device, such that the impact load is transferred to the frame rails. In the engaged condition, the restraint elements constrain rotation of the trailer crash cushion relative to the tow vehicle, and rotation of the first hitching component relative to the second hitching component, about the vertical axis. The terms "constrain" and "restrain," and variations thereof, refer to substantially preventing or restricting relative movement.

In one embodiment, as shown in FIG. 5, the restraint elements 42 are positioned in a substantially horizontal plane spaced above a horizontal plane of the hitch tongue 30, and preferably in alignment with the frame rails 36. It should be understood that the struts could alternatively be pivotally secured to the vehicle and rotated into the engaged condition/position by releasably securing the struts to the crash cushion. In yet another embodiment, both ends 48, 50 of the strut are releasably secured to the vehicle and crash cushion respectively, such that the struts are completely removed and disconnected from the vehicle and crash cushion, whereinafter they can be stored on the truck or trailer when in the disengaged condition/position.

Referring to FIGS. 6 and 7, the restraint elements 42 are configured as extensible/compressible cylinders, which are used in the same orientation as the rigid struts when in the engaged condition/position, but remain in place during impact conditions and during travel or backing, i.e., the restraint elements 42 are secured between the crash cushion 10 and the tow vehicle 34 while in the engaged and disengaged conditions. The cylinders are preferably fluid cylinders, including for example and without limitation pneumatic and hydraulic cylinders. In one embodiment, two restraint element cylinders are plumbed together and include a single valving arrangement 52 that permits fluid flow to and from the piston cylinders during normal turning or backing, such that the restraint elements 42 can be extended or compressed, i.e., their length can be varied. During an impact, however, the valving arrangement 52 constrains or limits the fluid flow, thereby locking the cylinders, or putting them in an engaged condition, such that they act as rigid members and prevent rotation of the crash cushion 10 relative to the vehicle 34, and rotation of the trailer hitch component 40 relative to the vehicle hitch component 38, about the vertical axis 46. In one embodiment, the valving arrangement 52 includes a restrictive orifice that precludes instantaneous fluid flow therethrough.

In another embodiment, a trailer surge activator 90 is connected to and incorporated into the valving arrangement 52. The surge activator closes one or more valves at each cylinder, or single valve connected to both cylinders, during an impact. As shown in FIGS. 6 and 7, two-stage telescoping cylinders are used as the restraint element 42 to achieve 90 degrees rotation travel of the crash cushion relative to the tow vehicle about the vertical axis. In other embodiments, a single stage, or cylinders with more than two-stages can be used. As shown in FIG. 8, a pair of single-stroke cylinders 54 can be secured to each other to form a single restraint element, thereby providing increased travel capability. In this embodiment, the ram extensions 56 from the cylinders extend in opposite directions from the assembly.

It should be understood that a single valve can control the flow to both restraint elements, or that each restraint element can have its own control valve. Of course, more than two valves can also be used. Preferably, both ends 48, 50 of the restraint elements are pivotally secured to the crash cushion and the vehicle respectively, again with the ends of the cylinders secured to the vehicle preferably being positioned adjacent the frame rails 36 such that the loads from the cylinder are transferred to the frame rails.

Referring to FIGS. 9 and 10, a telescoping, or extensible/compressible trailer tongue 58 is disclosed. The telescoping trailer tongue includes a shear element 60, such as a shear pin, that is sheared or breaks upon impact by a vehicle against the crash cushion, thereby allowing the tongue to collapse or compress and travel forward such that the length thereof is reduced from a first to a second length until impact pads 62 on the trailer strike or engage corresponding impact pads/elements 64 on the rear of the truck. The impact pads/elements 62, 64 define the restraint element. When the pads 62, 64 are engaged on one or both sides of the trailer/truck, such that the restraint elements are in the engaged condition/position, rotation of the crash cushion trailer with respect to the truck is constrained.

Referring to FIGS. 11 and 12, each of the restraint members 42, shown as fluid cylinders, are secured to an intermediate portion 66 of the trailer hitch tongue 30. In this application, the fluid cylinder is located above the trailer tongue and mount on the truck outboard as explained above. The restraint elements 42 may have to be angled from the tongue to the mounting portion of the truck, or different brackets can be secured to one or both of the tongue and truck to accommodate the height differential. For example, in one embodiment (now shown), bracket is secured to the frame rail and includes a portion aligned in the same plane with the tongue. By attaching the cylinders to the tongue, a convention, single-stage/stroke cylinder can be used while still permitting rotation of the crash cushion relative to the vehicle and the trailer hitch component relative to the vehicle hitch component when the restraint elements are in the disengaged condition.

In the embodiments of FIGS. 6-12, the restraint elements primarily work in compression to constrain rotation of the trailer crash cushion relative to the two vehicle, such that one or the other or both of the restraint elements are constraining such rotation. Of course, the restraint elements also provide some tension resistance on the other side of the hitching component. The restraint elements of FIGS. 3 and 4 work both in tension and compression.

Referring to FIGS. 13 and 14, the restraint element 42 works almost exclusively in tension. In particular, a properly sized tether 68, for example a cable or chain, has one end 72 attached on one side of the truck, e.g. adjacent a frame rail 36. The tether 68 travels past and is disposed on a pair of horizontally spaced guides 70 positioned on opposite sides of the front portion 4 of the crash cushion, e.g., on the trailer frame, and back to the other side of the truck where the other end 74 of the tether is secured, e.g., adjacent the other frame rail 36. During normal trailering and backing motions, the restraint element, or tether 68, is in a disengaged condition, such that the trailer crash cushion 10 is able to rotate from side to side about the vertical axis 46, thereby translating the tether element 68 relative to the guides 70.

During an impact situation, a trailer surge activator 90, or other sensor, actuates a brake 76, which grips the tether element 68 and prevents movement thereof relative to the guides 70. The immobile tether element 68 is thereby put in an engaged condition, such that the portion thereof opposite the direction of rotation is placed in tension and restrains rotation of the trailer crash cushion 10 relative to the vehicle 34 about the vertical axis 46.

Referring to FIGS. 15 and 16, a free end 80 of each of a pair of tether elements 82 are connected to opposite sides of the vehicle, for example adjacent the frame rail 36. The other end of the tether elements are gathered by a retraction mechanism 84, which winds up or lets out the tether element 82 during normal trailering movements, i.e., when in the disengaged condition. In the event of an impact, the retraction mechanism 84 grips or brakes the tether element 82, thereby putting the restraining element in an engaged condition, either by activation from a surge activator 90 or by centrifugal motion of elements within the mechanism (similar to a seat belt). The retraction mechanism 84 thereby restrains the movement of the tether element 82 and the rotation of the crash cushion 10 relative to the vehicle 34, or rotation between the respective hitch components 38, 40, about the vertical axis 46.

In another embodiment (not shown), a custom hitch assembly incorporates braking elements to prevent rotation between the hitch components themselves. During an impact condition, a surge activator, or other sensor/device, actuates a braking mechanism on the hitch thereby constraining rotation between the hitch components which are in the engaged condition. For example, a friction brake assembly can be configured and incorporated into a fifth wheel assembly. In this embodiment, the restraining element is the brake and hitch components themselves, and does not require any additional struts, cylinders or cables. During regular towing or backing, the restraining elements are put in a disengaged condition.

In a similar embodiment (not shown), the hitch incorporates a hydraulic damper. During normal trailering operations, wherein the restraining element is in the disengaged condition, the rotation of the trailer relative to the truck is permitted by flow of fluid through a valving arrangement in the hitch component. In the event of an impact, the restraining element is operable in the engaged condition, wherein the flow of fluid is restricted or stopped, for example by a signal from the surge activator, such that the hitch components are constrained from rotating relative to each other.

Although the present invention has been described with reference to preferred embodiments, those skilled in the art will recognize that changes may be made in form and detail without departing from the spirit and scope of the invention. As such, it is intended that the foregoing detailed description be regarded as illustrative rather than limiting and that it is the appended claims, including all equivalents thereof, which are intended to define the scope of the invention.

What is claimed is:

1. A crash attenuator comprising:
    a crash cushion comprising a front end, a rear end, and a trailer hitch component disposed adjacent said front end;
    at least one wheel supporting said crash cushion, wherein said at least one wheel is spaced rearwardly from said trailer hitch component; and
    a tether comprising a cable having opposite end portions positioned on opposite sides of said trailer hitch component, said opposite end portions each adapted for connection to a tow vehicle, wherein said tether is guided by at least one guide connected to said crash cushion and is moveable relative to said at least one guide when said tether is in a disengaged condition such that said opposite end portions are moveable toward and away from said at least one guide respectively.

2. The crash attenuator of claim 1 further comprising a brake operable to grip said tether in an engaged condition.

3. The crash attenuator of claim 2 further comprising a surge activator coupled to said brake, wherein said surge activator actuates said brake to grip said tether.

4. The crash attenuator of claim 1 wherein said tether is non-moveable relative to said at least one guide when said tether is in an engaged condition.

5. The crash attenuator of claim 1 wherein said tether wraps around at least a portion of said at least one guide.

6. The crash attenuator of claim 1 wherein said at least one guide comprises a pair of laterally spaced guides disposed on opposite sides of a centerline defined by said trailer hitch component.

7. A crash attenuator comprising:
    a crash cushion comprising a front end, a rear end, and a trailer hitch component disposed adjacent said front end;

at least one wheel supporting said crash cushion, wherein said at least one wheel is spaced rearwardly from said trailer hitch component;

a pair of guides coupled to said crash cushion and laterally spaced on opposite sides of a centerline defined by said trailer hitch component; and a generally U-shaped tether comprising a cable having opposite end portions positioned on opposite sides of said hitch component, said tether wrapped around said pair of guides and having an intermediate portion disposed between said guides, wherein said tether is moveable relative to said guides when in a disengaged condition such that said opposite end portions are moveable toward and away from said guides respectively.

8. The crash attenuator of claim 7 further comprising a brake operable to grip said intermediate portion.

9. The crash attenuator of claim 8 further comprising a surge activator coupled to said brake, wherein said surge activator actuates said brake to grip said intermediate portion of said tether.

10. A crash attenuator comprising:

a crash cushion comprising a front end, a rear end, and a trailer hitch component disposed adjacent said front end;

at least one wheel supporting said crash cushion, wherein said at least one wheel is spaced rearwardly from said trailer hitch component; and a tether comprising a chain having opposite end portions positioned on opposite sides of said trailer hitch component, said opposite end portions each adapted for connection to a tow vehicle, wherein said tether is guided by at least one guide connected to said crash cushion and is moveable relative to said at least one guide when said tether is in a disengaged condition such that said opposite end portions are moveable toward and away from said at least one guide respectively.

11. The crash attenuator of claim 10 further comprising a brake operable to grip said tether in an engaged condition.

12. The crash attenuator of claim 11 further comprising a surge activator coupled to said brake, wherein said surge activator actuates said brake to grip said tether.

13. The crash attenuator of claim 10 wherein said tether is non-moveable relative to said at least one guide when said tether is in an engaged condition.

14. The crash attenuator of claim 10 wherein said tether wraps around at least a portion of said at least one guide.

15. The crash attenuator of claim 10 wherein said at least one guide comprises a pair of laterally spaced guides disposed on opposite sides of a centerline defined by said trailer hitch component.

16. A crash attenuator comprising:

a crash cushion comprising a front end, a rear end, and a trailer hitch component disposed adjacent said front end;

at least one wheel supporting said crash cushion, wherein said at least one wheel is spaced rearwardly from said trailer hitch component;

a pair of guides coupled to said crash cushion and laterally spaced on opposite sides of a centerline defined by said trailer hitch component; and a generally U-shaped tether comprising a chain having opposite end portions positioned on opposite sides of said hitch component, said tether wrapped around said pair of guides and having an intermediate portion disposed between said guides, wherein said tether is moveable relative to said guides when in a disengaged condition such that said opposite end portions are moveable toward and away from said guides respectively.

17. The crash attenuator of claim 16 further comprising a brake operable to grip said intermediate portion.

18. The crash attenuator of claim 17 further comprising a surge activator coupled to said brake, wherein said surge activator actuates said brake to grip said intermediate portion of said tether.

* * * * *